United States Patent [19]

Heyneman

[11] 4,374,582

[45] Feb. 22, 1983

[54] COMPRESSED AIR-ACTUATED VALVE MEANS

[75] Inventor: Guido Heyneman, Knokke, Belgium

[73] Assignee: Siemens Aktiengesellschaft, Berlin & Munich, Fed. Rep. of Germany

[21] Appl. No.: 124,360

[22] Filed: Feb. 25, 1980

[30] Foreign Application Priority Data

Mar. 19, 1979 [DE] Fed. Rep. of Germany ....... 2910752

[51] Int. Cl.³ .......................................... F16K 31/122
[52] U.S. Cl. ................................. 251/62; 137/625.26; 137/625.69; 251/31
[58] Field of Search ...................... 137/625.25, 625.26, 137/625.67, 625.69; 251/31, 62, 63, 63.5, 325

[56] References Cited

U.S. PATENT DOCUMENTS

| | | | |
|---|---|---|---|
| 2,086,678 | 7/1937 | Plint et al. | 251/31 |
| 2,616,449 | 11/1952 | Maha | 251/31 |
| 2,792,019 | 5/1957 | Lieser | 251/31 |
| 2,792,020 | 5/1957 | Lieser | 251/31 |
| 2,974,682 | 3/1961 | Trask | 251/31 |
| 3,570,540 | 3/1971 | McInnes et al. | 251/62 |

Primary Examiner—George L. Walton

Attorney, Agent, or Firm—Hill, Van Santen, Steadman, Chiara & Simpson

[57] ABSTRACT

A compressed air-actuated valve means useful for attachment to devices used in chemical analysis wherein a piston actuates a suitably positioned slide member in the piston thrust direction. The slide member glides on a base member provided with spaced-apart holes that extend approximately perpendicular to the glide surface of the base member. The holes are connected to one another on the side of the base member facing the slide member via at least one appropriately arranged groove positioned in the slide facing the base member. Intake and discharge nozzles are connected with such holes on the opposite side of the base away from the slide member. The piston is a double-headed piston with each piston head being of a different diameter and each head being positioned at opposite ends of the slide member so that the slide member moves with the piston. The piston head with a smaller diameter is constantly biased with compressed air from a suitable compressed air source and the other piston head with the larger diameter is selectively biased with compressed air from the same source for controlling the slide movement.

3 Claims, 9 Drawing Figures

COMPRESSED AIR-ACTUATED VALVE MEANS

BACKGROUND OF THE INVENTION

1. Field of the Invention

The invention relates to compressed air-actuated valves and somewhat more particularly to valves useful for attachment to devices used in chemical analyses wherein a piston actuates a suitably arranged slide member in the piston thrust direction, with the slide member being glidable on a base provided with spaced-apart holes extending perpendicularly to the base glide surface and being connectable to one another on one side via at least one groove appropriately arranged in the slide member surface facing the base and on the other side of the base such holes are connected with select intake and/or discharge nozzles.

2. Prior Art

Compressed air-actuated valves which can be attached to or with other devices, such as pumps, containers and the like require the lowest possible amount of "dead" (i.e., unusable or unnecessary) volume and such valves must be assemblable in a space-saving manner. In order to actuate typical known valves with compressed air, the compressed air acts on a spring-loaded piston in such a manner that upon evacuation of the piston chamber volume, the valve closes immediately under the urging of the spring. The incorporation of such a "re-set" spring in a valve structure requires not only additional structural elements but also requires an increase in the overall height dimension of the valve in the direction of the work motion.

SUMMARY OF THE INVENTION

The invention provides a universally employable valve means actuated by compressed air but functioning without a re-set spring while having a minimum dead volume and being assemblable in a very space-saving manner.

In accordance with the principles of the invention, a valve means is provided with a double-headed piston, whereby piston heads of different diameters are arranged on both sides of a slide member controlling the flow path of fluids regulated by the valve means whereby the piston head with the smaller diameter is constantly biased via compressed air and the piston head with the larger diameter is selectively biased via compressed air to control the movement of the slide member.

In preferred embodiments of the invention, the slide member is interchangeably seated within a slide mount. With such embodiment, an operator can, as a function of the slide member position, reverse the function of the nozzle connected to the valve so that an intake nozzle can be changed into a discharge nozzle or vice-versa. Such a structure is achieved in a relatively simple manner by arranging holes in the base upon which the slide member moves and a groove in the slide member in a mirror-inverted fashion.

In order to provide easy access to moveable elements of the inventive valve means, the slide member, together with the slide mount and a base therefor, sometimes referred to as a pressure-plate member, are housed in a chamber of a valve housing or block which is open at one side of such housing. In this arrangement, the slide member is urged against the base or pressure plate by at least one compression spring. Preferably, such compression spring acts on the slide member and/or the slide mount via a ball-bearing means. The other end of the compression spring is supported against a cover member positioned over the main chamber in the valve housing and which is secured onto the housing, which preferably is of a prismatic shape. In a preferred embodiment, such cover member is formed of a transparent material so as to allow an operator to readily detect any leakage and to readily observe the position of the slide member within the valve means.

The various elements of the inventive valve means are preferably composed of chemically inert materials.

A specific embodiment of the inventive compressed air-actuated valve means comprises a prismatically-shaped housing having a main chamber therein which has an opening on a first face surface of such housing and two opposing spaced-apart auxiliary chambers communicating with the main chamber, each having an access opening on a second and third face surface, respectively, of the housing. Auxiliary cover members are positioned in each of the auxiliary chambers to respectively define first and second piston chambers, with one of such piston chambers being larger than the other piston chamber. A double-headed piston is positioned along the bottom of the main chamber so as to be reciprocally moveable along a longitudinal axis of the housing, with each piston-head mating with a corresponding piston chamber. The piston rod or slide mount between the respective piston-heads is provided with a receiving chamber on the side thereof facing the bottom of the main chamber. A slide member having at least one groove extending perpendicularly and/or parallelly to the longitudinal axis of the piston rod is positioned in the piston rod receiving chamber. A base member or pressure-plate member having a select number of holes extending perpendicularly to the longitudinal axis of the piston rod is positioned on the bottom of the main chamber in cooperation with the slide member so that certain of the holes in the pressure-plate member communicate with one another via a groove in the slide member. Inlet and outlet nozzles are provided with orifices on a fourth face surface of the housing and in communication with at least some of the holes in the pressure-plate member. Each of the piston-head chambers is provided with an air-passageway communicating with a compressed air source. The smaller diameter piston-head chamber is arranged so as to be in direct communication with the compressed air source whereby the piston-head therein is continuously urged against the opposing piston-head. The larger diameter piston-head chamber is arranged in selective communication with the compressed air source, as via a control valve actuated by compressed air, so as to selectively move the larger diameter piston-head in opposition to the smaller diameter piston-head and thereby move the slide member to a select position on the pressure plate. The main chamber of the housing is sealed by a cover member, preferably composed of a transparent material, such as Plexiglas (a registered trademark for a methyl acrylate plastic). A compression spring is mounted from the cover member via a depending finger or shaft so as to urge the slide member against the pressure-plate member in a sealing fashion. In preferred embodiments, a ball-bearing means is interposed between the compressed spring and the slide mount.

DESCRIPTION OF THE PREFERRED EMBODIMENTS

Figure 1:
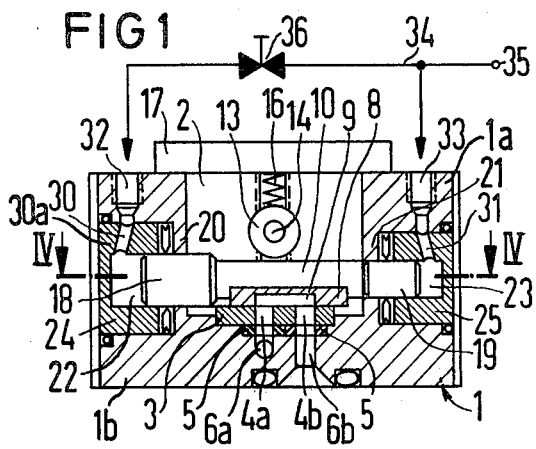
FIG. 1 is an elevated, cross-sectional view, shown partially schematically, of an exemplary embodiment of a valve means constructed and operable in accordance with the principles of the invention, taken along lines I—I of FIG. 2.
Figure 2:
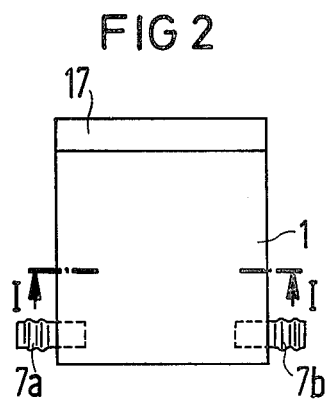
FIG. 2 is an elevated side view of a valve means of the invention.
Figure 3:
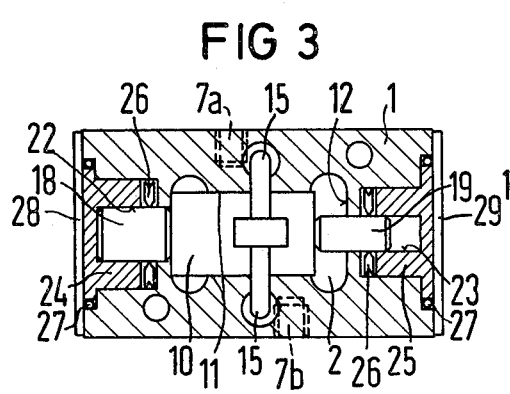
FIG. 3 is a top view somewhat similar to that of FIG. 1 but without a covering member.
Figure 4:
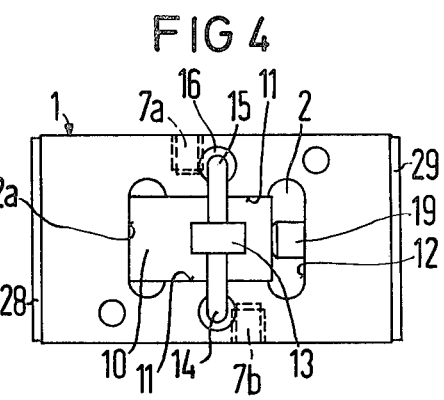
FIG. 4 is a sectional view taken along lines IV—IV of FIG. 1.

In the various Figures, like elements are referenced with like numerals. Referring now to FIGS. 1-4, a prismatic housing 1 (i.e., a geometrically symmetrical valve block) is provided with a main chamber 2 which is open for access at a first surface 1a of housing 1. A base member or pressure-plate member 3 is positioned along the bottom or floor of chamber 2. The pressure-plate member 3 is provided with at least two spaced-apart holes or apertures 4a and 4b extending through the plate member 3 in an essentially vertical direction. The apertures 4a and 4b are aligned via annular seals 5, with fluid-passageways 6a and 6b provided through a second surface 1b of housing 1. External connection nozzles 7a and 7b (best seen at FIGS. 1, 3 and 4) are connected with passageways 6a and 6b to provide communication with external fluid flow lines being controlled by the inventive valve means.

A slide member 8 is moveably positioned on the pressure-plate member 3 and includes at least one groove 9 on the surface thereof facing the plate member 3. In the embodiment shown at FIG. 1, the groove 9 extends along the longitudinal direction of plate member 3, however, in other embodiments, it can extend perpendicularly to such longitudinal direction, as will be explained hereinafter. When the slide member 8 is in the position shown at FIG. 1, groove 9 interconnects the apertures 4a and 4b with one another. The slide member 8 is housed in a slide mount 10, which in preferred embodiments has a prismatic form. The rod-like slide mount 10 (sometimes referred to as a piston rod) is guided laterally within chamber 2 via housing side walls 11 (FIGS. 3 and 4) and its axial or vertical mobility is limited by opposing end faces 12 of chamber 2. A ball-bearing means 13, which is fixed in the vertical direction with the aid of shaft 14, cooperates with the slide mount 10. The ends of shaft 14 terminate in bores 15 (FIGS. 3 and 4) which receive at least one compression spring 16 (FIG. 1). The compression spring 16 is counter-seated in a cover member 17, which in preferred embodiments can be screwed onto the housing 1 so as to seal chamber 2 thereof. The cover member 17 is preferably composed of a relatively inert transparent material, such as Plexiglas (a registered trademerk for a methyl acrylate plastic). When the cover member 17 is in its assembled position, spring 16 is compressed so that the ball bearing means 13 is continuously urged or biased against the top side of the slide mount 10 via shaft 14. The spring pressure is selected in such a manner that the slide member 8 moveably contacts pressure-plate member 3 but forms a substantially impermeable seal therewith. The cooperating surfaces of members 3 and 8 must be suitably processed, such as by polishing, in an appropriate manner to provide such a moveable seal.

The actuation of slide member 8 or, respectively, the slide mount 10, occurs via two piston heads 18 and 19 positioned on opposite sides of the slide member and interconnected with one another via a piston rod or slide mount 10. As shown, one of the piston-heads, for example 18, is of a large diameter than the other piston-head. The pistons or piston-heads 18 and 19 respectively mate and are guided by appropriate orifices extending horizontally through partition walls 20 and 21 of housing 1 as well as by cylindrically-shaped recesses 22 and 23 provided in auxiliary cover members 24 and 25. With the assistance of appropriate sealing rings 26 and 27 (FIG. 3), auxiliary cover members 24 and 25 are sealed relative to the pistons 18 and 19 as well as relative to the housing 1. Secondary cap members 28 and 29 can be provided to secure the auxiliary cover members 24 and 25 to the body of housing 1. The auxiliary cover members 24 and 25 are, respectively, provided with air-passageways 30 and 31 which respectively communicate with connection nozzles 32 and 33 for a compressed air line 34, which is connected to a compressed air source 35. As shown, compressed air line 34 is arranged to be in direct communication with connection nozzle 33, air-passageway 31 and recess 23 within auxiliary cover member 25. However, on the other side, a controllable valve means 36 is operationally positioned within the compressed air line communicating with connection nozzle 32, air-passageway 30 and recess 22 within auxiliary cover member 24.

Given a closed valve means 36, air line 34 is constantly filled with compressed air and thus moves piston 19 toward the left (with respect to the illustrations of FIGS. 1, 3 and 4) until the slide mount 10 is stopped by a front end face 12a (FIG. 4) and a cylindrical recess 22 is emptied. In this mode, the longitudinal groove 9 in slide member 8 is positioned only over the left-hand aperture 4a and closes aperture 4b.

If the valve means 36 is now opened, then the recess 22 is placed under pressure from the incoming compressed air and, because the effective surface area of piston 18 is substantially larger (typically twice as large) as the effective surface area of the piston 19, it overcomes the force exerted by piston 19 and moves the slide mount 10, along with slaving slide member 8, toward the right-hand side, with respect to the illustration of FIG. 1. In this mode, the longitudinal groove 9 then interconnects the apertures 4a and 4b with one another. This operative position is illustrated in FIG. 1.

If, on the other hand, the valve means 36 is again closed or the cylindrical recess 22 emptied, then the slide mount 10 together with slide member 8 returns to the position described earlier under the influence of piston 19, which is constantly charged with compressed air. The switching state of vlave means 36, which in preferred embodiments is controllably actuated by compressed air, provides direct information as to the actual position of the slide member 8, or, the operational mode of the valve means.

Air-passageways 30 and 31 of auxiliary cover members 24 and 25 can discharge into annular grooves 30a and 31a provided along the outer rear periphery of cylindrical recesses 22 and 23 so that the compressed air entering such recesses is certain to become effective at the respective piston surfaces. In the exemplary embodiment illustrated in FIGS. 1-4, the passageways 6a and 6b are in communication with external connection nozzles 7a and 7b on opposite sides of housing 1 for attachment to select devices, such as used in chemical analysis, i.e., titration devices, sample-gathering devices, metering syringes and the like.

Figure 5:
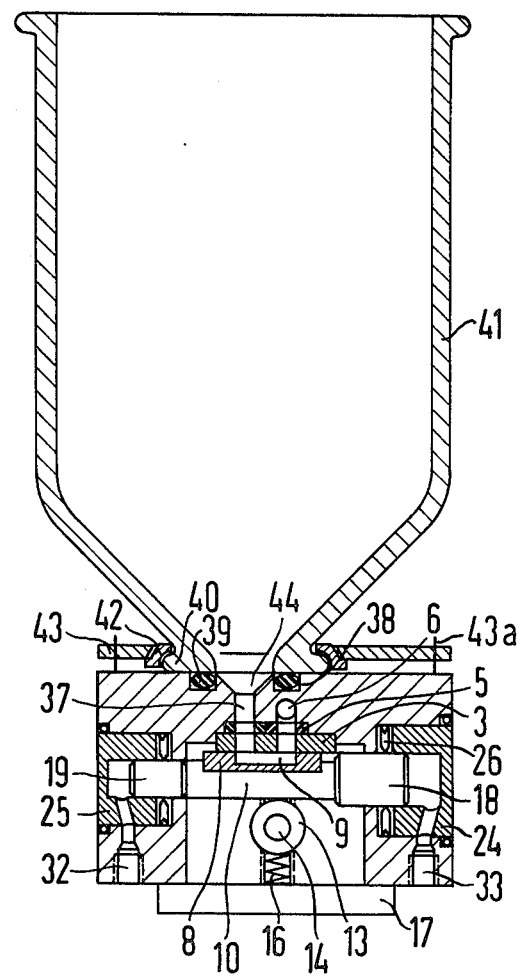
FIG. 5 is an elevated cross-sectional view, shown somewhat schematically, of a valve means of the invention functioning as a discharge means for a container.

The valve means of the invention is particularly useful for attachment to various devices used in chemical analysis, such as shown in FIGS. 5 and/or 6. FIG. 5 illustrates an arrangement wherein the inventive valve means comprises a discharge valve for a mixing or a titration container or the like. In this embodiment, one of the fluid passageways (such as 6a of FIG. 1) is directed perpendicularly upwardly via a nozzle 37 which terminates in a funnel-like mouth 44 communicating directly with the open bottom of container 41. In order to tightly connect the valve means with the container 41, an annular groove 38 is provided concentrically about nozzle 37 and an O-ring 39 is seated within the groove 38. The container 41 may be provided with beaded edge 40 which is positionable on the O-ring 39. An elastic ring 42 which has a Z-like cross-section snap fits over the beaded edge 40 of container 41 and a cover plate 43 having an appropriate opening to accommodate the bottom of the container secures the ring 42 and thus container 40 to the housing 1 of the valve means via suitable connecting screws 43a. The container 41 can be a mixing or stirring container, a receiving container, a reaction container, a titration container or other like containers. In the latter embodiment (titration container) container 41 can be tightly sealed at its top by an appropriate cover and suitable electrodes or the like can be guided through such cover into the interior of the container. The exemplary embodiment of FIG. 5 differs from the exemplary embodiment of FIGS. 1-4 only in that nozzle 37 is directed upwardly, terminating in a funnel-like mouth and includes a sealing means (groove 38 and ring 39) arranged concentrically therewith. Of course, some other shaped aperture-end can be used instead of the funnel-shaped mouth, if desired.

Figure 7:
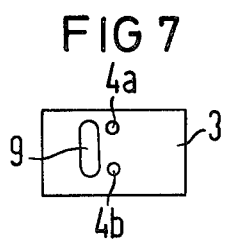
FIGS. 7-9 are schematic views of various embodiments of certain elements (apertures of pressure-plate members combined with grooves of slide members) useful in the construction and operation of the inventive valve means.

In the exemplary embodiment discussed in conjunction with FIGS. 1-5, the slide member 8 included a longitudinally extending groove 9 and the pressure-plate means 3 included two spaced-apart apertures 4a and 4b positioned one behind the other along the linear movement direction of the slide member. However, in other embodiments, apertures 4a and 4b can also be positioned perpendicular to the slide member movement direction, as shown in FIG. 7. In such embodiment, the groove 9 in slide member 8 no longer extends in the longitudinal direction of member 8 but rather, as shown, perpendicular thereto. This arrangement of cooperating apertures and grooves is of advantage because the dead volume can be even further minimized. FIG. 7 schematically illustrates the position of the cooperating groove and apertures with the valve means 36 closed in accordance with the slide member position shown at FIGS. 3 and 4. Upon opening of the valve means 36, the cross-wise extending groove 9 interconnects the two apertures 4a and 4b. In embodiments where the cross-wise extending groove 9 is asymmetrically arranged within a slide member, the two apertures 4a and 4b can be connected to one another by inserting the slide member 8 into the slide mount 10 in an 180° offset manner from the original position discussed.

Figure 8:
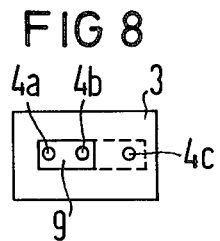

FIG. 8 illustrates an embodiment wherein a pressure-plate member 3 is provided with three spaced-apart and longitudinally aligned apertures 4a, 4b and 4c. Such a plurality of apertures can be selectively connected with one another via a longitudinally extending groove 9 provided in slide member 8. The present operative position of the longitudinal groove is shown in solid line and the alternative operative groove position is shown in broken line. Apertures 4a, 4b and 4c can also be arranged perpendicular to the direction of slide member movement. In such an embodiment, the slide member can be provided with two cross-wise extending grooves arranged in an offset manner relative to one another whereby two apertures cooperate by pairs with one of the grooves at a first slide member position and the other two apertures cooperate by pairs with the other groove at a second slide member position. This embodiment of the inventive valve means is particularly useful in conjuction with meterin syringes, whereby a cylinder of such a syringe can be attached to the valve housing via spacer pins.

Figure 9:
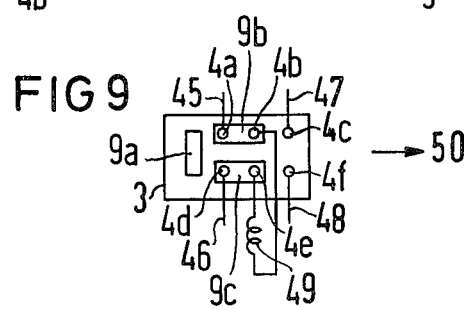

FIG. 9 illustrates a further exemplary embodiment of the inventive valve means useful, for example, with sample-taking devices in titration systems. The pressure plate member 3 in this embodiment is provided with six apertures 4a through 4f which can be selectively connected to one another via three grooves 9a through 9c provided in a cooperating slide member. All of the apertures 4a through 4f are provided with corresponding connection conduits whereby, for example, conduits 45 and 46 connected to apertures 4a and 4b respectively, are connected to an electrolysis bath from which a precisely metered amount of a sample can be removed with the assistance of a sample removal loop 49. As shown, the sample removal loop 49 is connected to apertures 4b and 4e and provides a precise volume of sample. At the position illustrated in FIG. 9, a sample can be removed from a suitably connected container via conduit 45, groove 9b, aperture 4b, sample removal loop 49, aperture 4e, groove 9c, aperture 4d and conduit 46. If, give a filled sample removal loop 49, the slide member is moved in the direction of arrow 50, then groove 9b becomes positioned over apertures 4b and 4c, groove 9c interconnects apertures 4e and 4f and the cross-wise extending groove 9a interconnects apertures 4a and 4d. In this operational position, a constantly fresh sample is sent through the valve means via conduits 45 and 46 in cooperation with groove 9a. On the other hand, the sample within the loop 49 can be delivered to conduits 47 and 48, which, for example, can be connected with a metering syringe that adds a specific quantity of water to the sample. The flow path formed for the foregoing operation arises from fluid communication between conduit 48, aperture 4f, groove 9c, aperture 4e, loop 47, aperture 4b, groove 9b, aperture 4c and conduit 47. Sample removal with the addition of distilled water or other suitable solvent is advantageous in that the sample removal loop 47 is continuously cleansed during operation in this manner.

As the exemplary embodiments of FIGS. 7-9 show, practically as many connections between a plurality of conduits and the inventive valve means can be provided as desired, whereby the plurality corresponds to a required or given need. The apertures can be arranged not only in the motion direction of a slide member but can also be arranged perpendicular thereto and can be arranged so that some apertures are in the motion direction and some are perpendicular, as shown by the embodiment of FIG. 9.

Figure 6:
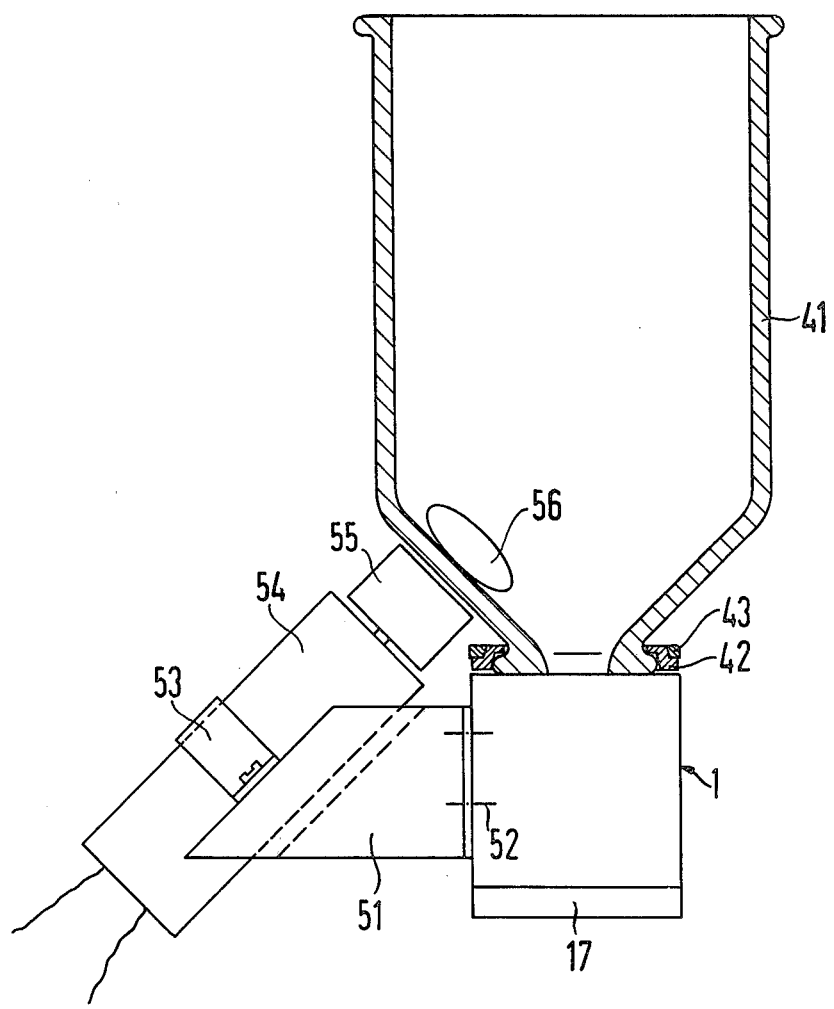
FIG. 6 is a somewhat similar view to that of FIG. 5 showing the valve means with an attached stirring motor.

By utilizing a prismatic shape, the inventive valve means has an additional advantage in that a stirring motor or the like can be readily attached thereto in a simple manner, as illustrated in FIG. 6. As shown, a pair of arms 51 can be attached to the valve housing 1 via suitable connection means, schematically shown at 52. An electrically operating stirring motor 54 having a stator therein can be supported on the arms 51 and secured thereto via a suitable strap member 53. The motor 54 drives a permanent magnet 55 which exerts in magnetic field or coupling through an adjacent wall of the container 41 and drives a ferromagnetic stirring member 56.

Referring back to FIGS. 1-4, chamber 2 can be completely encapsulated with cover member 17. However, under certain conditions of use, reactive gases or vapors can form in chamber 2 or crystals or other solide deposits can form on the sealing surfaces within the valve means. In such instances, the chamber 2 can be provided with aeration apertures which communicate with the ambient atmosphere about the valve means, thus allowing any reactive fluids in chamber 2 to escape or to be removed. Depending upon a particular use, the aeration apertures can be connected to suitable air, water or other solvent sources so that such cleansing or washing materials flow, under positive pressure, through the chamber 2 and past the sealing surfaces so as to remove or dissolve crystals or the like which may have formed and be presented in the chamber. Air released upon actuation of the valve means (i.e., from one of the piston chambers 22 or 23) can be used for this purpose.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. In a compressed air-actuated valve means for attachment to various devices, such as useful in chemical analyses, wherein a piston means actuates a slide member in the piston thrust direction and said slide member linearly glides on a base member having at least two spaced-apart apertures extending approximately perpendicularly to the gliding surface of said slide member, said apertures being connectable with one another on one side of said base member via at least one groove correspondingly arranged on a surface of said slide member and being connectable on the other side of said base member with intake and discharge nozzles, wherein the improvement comprises:

said slide member (8) is interchangeably housed is a slide mount (10), said base comprises a pressure-plate (3) which is interchangeably housed in a valve housing (1), said apertures (4a . . . 4f) in said pressure-plate member (3) are connected via sealing rings (5) at the surface of said pressure-plate member (3) facing away from said slide member (8) with fluid-passageways (6a, 6b, 37) for connections external of said housing (1), at least one of such passageways (37) being directly connected with an open-bottom container (41) and being surround by a concentrically positioned groove (38) having a sealing ring (39) therein for supporting the open bottom of said container (41), said container (41) being provided with a beaded-edge (40) about the periphery of said open bottom thereof and which is adapted for positioning on said sealing ring (39), and an elastic ring (42) having an opening approximately corresponding to said beaded-edge (40) is snapped about said beaded-edge and attached to a surface of said housing.

2. In a compressed air-actuated valve means as defined in claim 1 wherein said one fluid-passageway (37) terminates at the housing surface with a funnel-like mouth (44).

3. In a compressed air-actuated valve means as defined in claim 1 wherein a stirring motor (54) having a stator therein is attached to said valve means housing, said stator driving a ferromagnetic stirring element (56) positioned in the interior of said container (41) via a magnetic coupling (55).

* * * * *